(12) United States Patent
Delaney et al.

(10) Patent No.: US 7,636,725 B2
(45) Date of Patent: Dec. 22, 2009

(54) XML MULTI-STAGE POLICY IMPLEMENTATION IN XSLT

(75) Inventors: Timothy Patrick Delaney, Midvale, UT (US); Richard John Matheson, Lindon, UT (US); Shon Vella, Orem, UT (US); Perin Blanchard, Orem, UT (US)

(73) Assignee: Novell, Inc., Provo, UT (US)

( * ) Notice: Subject to any disclaimer, the term of this patent is extended or adjusted under 35 U.S.C. 154(b) by 1539 days.

(21) Appl. No.: 10/369,833

(22) Filed: Feb. 20, 2003

(65) Prior Publication Data

US 2004/0193459 A1   Sep. 30, 2004

Related U.S. Application Data

(60) Provisional application No. 60/418,805, filed on Oct. 15, 2002.

(51) Int. Cl.
*G06F 17/30* (2006.01)
*G06F 7/00* (2006.01)

(52) U.S. Cl. .................................... 707/101; 707/10
(58) Field of Classification Search ............. 707/101, 707/10
See application file for complete search history.

(56) References Cited

U.S. PATENT DOCUMENTS

| | | |
|---|---|---|
| 5,903,755 A | 5/1999 | Matheson et al. |
| 6,108,619 A | 8/2000 | Carter et al. |
| 6,138,170 A | 10/2000 | Matheson |
| 6,189,103 B1 | 2/2001 | Nevarez et al. |
| 6,405,199 B1 | 6/2002 | Carter et al. |
| 6,466,944 B1 | 10/2002 | Stokes |
| 6,516,325 B1 | 2/2003 | Blanchard et al. |
| 6,546,433 B1 | 4/2003 | Matheson |
| 6,584,458 B1 | 6/2003 | Millett et al. |
| 6,585,778 B1 * | 7/2003 | Hind et al. .................. 715/235 |
| 6,671,688 B1 | 12/2003 | Nikols et al. |
| 6,697,813 B1 | 2/2004 | Backman |
| 6,993,657 B1 * | 1/2006 | Renner et al. ............... 713/182 |
| 2001/0034733 A1 * | 10/2001 | Prompt et al. ............... 707/102 |
| 2002/0059253 A1 * | 5/2002 | Albazz et al. ................. 707/10 |
| 2002/0122054 A1 * | 9/2002 | Hind et al. .................. 345/731 |
| 2002/0144248 A1 * | 10/2002 | Forbes et al. ................ 717/167 |
| 2003/0229529 A1 * | 12/2003 | Mui et al. ...................... 705/8 |

* cited by examiner

Primary Examiner—Kuen S Lu
(74) *Attorney, Agent, or Firm*—Haynes and Boone LLP

(57) ABSTRACT

A computing system for use in a computer network is provided. The computing system includes a main software application for providing bi-directional data sharing across directories, databases and applications on the computer network. The main software application works, at least in part, in response to XML events. The computing system also includes a data store that can send one or more XML documents back and forth to a transformation engine, the XML documents including XML events. The transformation engine is provided for taking the XML documents and applying the XML documents against an XSL style sheet or an XSL transformation to transform the XML events into a different type of event for a controlled application or service.

19 Claims, 1 Drawing Sheet

XML MULTI-STAGE POLICY IMPLEMENTATION IN XSLT

The present disclosure claims the benefit of U.S. Ser. No. 60/418,805 filed Oct. 15, 2002, and which is hereby incorporated by reference. The present disclosure is also related to U.S. Ser. No. 09/470,645, which is also hereby incorporated by reference.

BACKGROUND

This invention relates generally to computer software, and more specifically to a system and method for allowing an application program to integrate and/or synchronize with a computer directory.

Some computer software applications attempt to provide a bi-directional data sharing service to distribute new and updated information across directories, databases and critical applications on a network and across firewalls to partner systems. These applications often attempt to achieve uniform data integrity and automated efficiency by helping to eliminate the manual and repetitive tasks of creating and modifying user identities in all the different systems and applications within your enterprise and partner systems. The applications can make automatic change on business rules and can preserve authoritative data sources. An example such a software application is a software product called DirXML 1.0, which is provided by Novell, Inc. of Provo, Utah. A more detailed description of DirXML 1.0, as it pertains to the present embodiment herein discussed, is provided in U.S. Ser. No. 09/470,645, which is presently incorporated by reference.

A typical application configuration mixes policy, the data driven by the policy, the logic that selects a policy for a given user, and the logic that implements the policy in a target system. For example, an enterprise such as a large company can have different policies for different employees. Certain employees may be grouped into predetermined email and/or voicemail distribution groups, can be given access to certain buildings and/or laboratories, can be set to a defined pay scale, and so forth.

The target system becomes very large, and it is often difficult to maintain templates scattered throughout the configuration. Furthermore, a user of such an application is often required to have advanced skills in application tools (such as an extensible markup language—XML) and overall policy for the enterprise.

SUMMARY

An improved system and method is provided in a new and unique multi-stage transformation engine. The improved system and method can be used, for example, by a company or other enterprise that uses a relatively large, data-sharing type application. In one embodiment, a method for transforming information according to an enterprise policy includes the step of receiving, from a data store, the information in the form of one or more data objects. A plurality of policies are defined corresponding to a plurality of enterprise requirements in a first, relatively simple application. One or more of the policies can then be selected for the data object in a second application. Once selected, a third, relatively complex application can transform the data object for use by a fourth application according to the selected policy.

In another embodiment, a transformation engine for running on one or more computers is provided. The transformation engine includes an interface for receiving data objects including a data change event from a data store. The data objects correspond to information pertaining to an enterprise. A first application is provided so that a user having a relatively low skillset (e.g., as to programming knowledge for use by software running in the transformation engine) can define a plurality of policies corresponding to a plurality of requirements of the enterprise. A second application is provided so that one of the plurality of policies can be selected for the data change event. A third application is also provided for transforming the data object according to the selected policy for use outside the transformation engine.

In another embodiment, a computing system for use in a computer network is provided. The computing system includes a main software application for providing bi-directional data sharing across directories, databases and applications on the computer network. The main software application works, at least in part, in response to XML events. The computing system also includes a data store that can send one or more XML documents back and forth to a transformation engine, the XML documents including XML events. The transformation engine is provided for taking the XML documents and applying the XML documents against an extensible stylesheet language (XSL) style sheet or an XSL transformation to transform the XML events into a different type of event for a controlled application or service.

The transformation engine includes a customer task for defining a plurality of policies in an abstract manner for an enterprise, the plurality of policies being built as XML data that is structured in terms of an effect the policy will have on a target system. The transformation engine also includes a consultant task for selecting one or more policies that should be applied to the events, the selection of the policies being specific to the enterprise. The transformation engine further includes a development task for applying the one or more selected policies to the event by using XSL scripting code, the application of the policies performing one or more of: changing the event, hooking the event, binding the event with a template, and/or informing the data store that an action needs to be performed.

DETAILED DESCRIPTION

Figure 1:
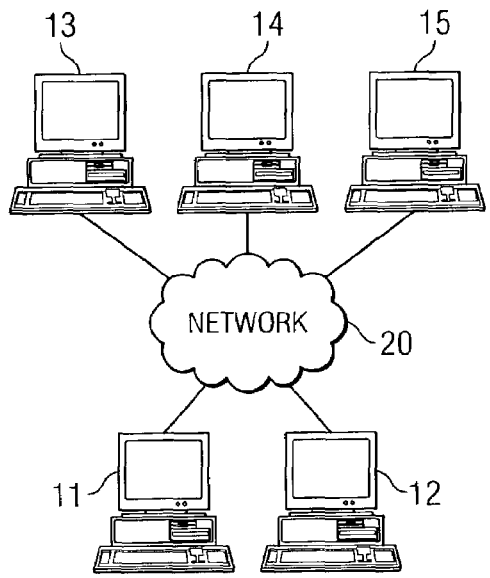
FIG. 1 is a block diagram of a computer network on which one embodiment of the present invention may be employed.

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings included herewith: Copyright 2002, Novell, Inc., All Rights Reserved.

For the sake of example, the following disclosure will discuss several embodiments of the invention as can be used with the DirXML 1.0 software product. It is understood, however, that DirXML 1.0 is only one example of a data management software product that can benefit from the present invention.

Referring now to FIG. 1, five computing systems 11, 12, 13, 14, and 15 are connected around a network 20. The computing systems can be any type of computer, including a personal digital assistant, wireless telephone, or personal computer. The network 20 may not always be connected to all the computers 11-15. For example, initially, the computers 11 and 15 may be connected, and then the computers 11, 13, and 14 are connected, and then only computers 11 and 12 are connected. Also, some of the computers 11-15 may actually be the same physical computer, and they are only illustrated separately to describe different jobs or tasks that may be performed by different users, by different subsystems, and/or at different times.

Figure 2:
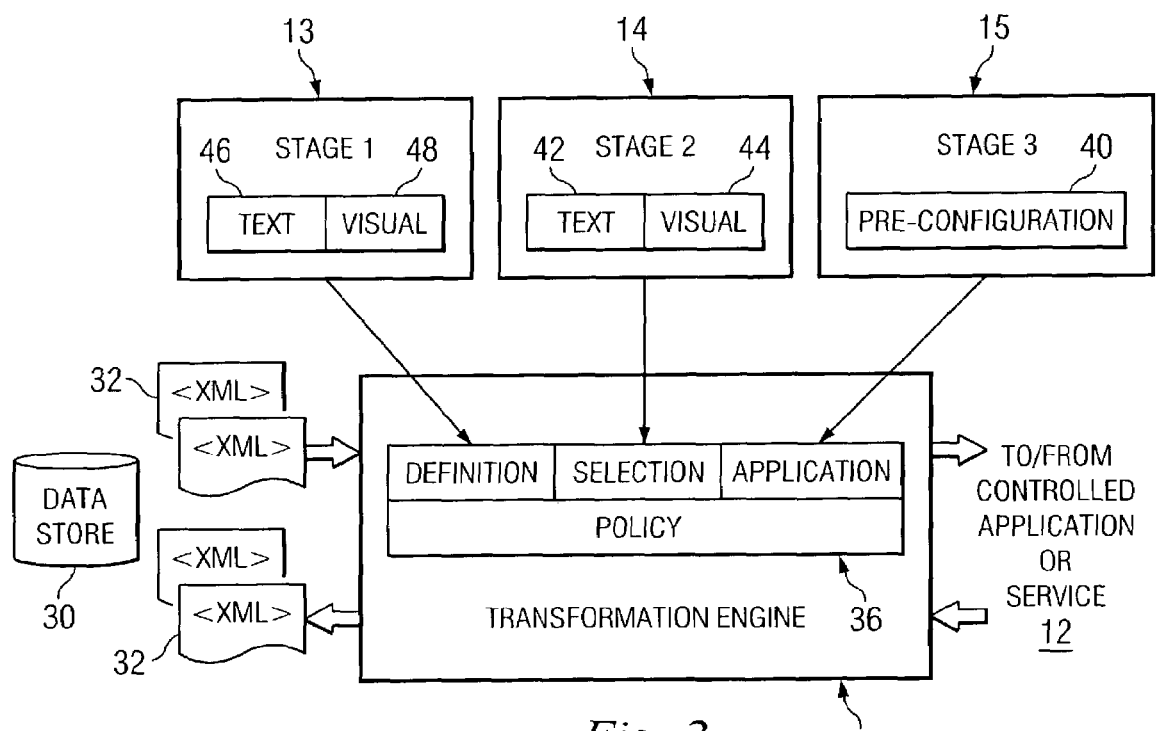
FIG. 2 is a block diagram of a transformation engine for implementing one embodiment of the present invention on the computer network of FIG. 1.

Referring also to FIG. 2, the first computer 11 includes a data store 30 that can send one or more XML documents 32 back and forth between it and a transformation engine 34. Although the data store 30 is illustrated as being associated with a single computer 11, it is understood that the data store will likely be associated with many different computers.

Within the transformation engine 34 there are several processes that take place. In some embodiments, the transformation engine 34 could be any piece of code that is consuming XML events, including the DirXML engine of the presently incorporated patent application Ser. No. 09/570,645. In the present example, the Transformation Engine 34 takes the XML documents 32 and applies them against an XSL style sheet or XSL transformation 36. The XSL transformation 36 can then transform the events 32 into any other type of event for a controlled application or service, such as may be running on computer 12.

Transforms implement a customer's business policies by controlling what information is shared, the form in which it is shared and what events should triggered based on the data. For example, an enterprise may have a business policy that adding a user into a directory should cause the user to be added to a controlled application on the computer 12. One policy might be applied to managers, another policy might be applied to non-manager employees, a different policy might be applied to a computer object that's being synchronized, and so forth. For example, transforms can be written to take a piece of business information such as Employee Status and effect a change on various applications. Using Employee Status, an employee can be placed in different platform groups and mail distribution lists, granted a certain amount of network file storage, be granted access to various applications and a host of other options. Applications that may be running on the computer 12 include email applications, Active Directories, and NT Domains.

Controlling and modifying the transformation engine 34 and/or the policies 36 can be very difficult for the unskilled or moderately skilled programmer. The present invention simplifies the task of implementing a business policy in DirXML and partitions tasks into actions likely to be performed by the customer, a DirXML deployment consultant, and/or a DirXML driver writer.

The customer task may require the least skill and knowledge and is performed as needed at the customer site. A typical DirXML configuration mixes policy, the data driven by the policy, the logic that selects a policy for a given user and the logic that implements the policy in a target system into large, difficult to maintain templates scattered throughout the configuration. Customer level policy data can be built as XML data that is structured in terms of the effect the policy has on the target system and does not require any knowledge of how DirXML would actually implement the policy.

The consultant task may require a strong but less in-depth knowledge of DirXML and some knowledge of the system being managed and is performed once per customer deployment. Consultant level policy selection may require knowledge of DirXML and XSLT, especially relating to scanning an object for data and querying a system for additional data. But it does not require a deep understanding of DirXML or the systems being managed.

The development task may require in-depth knowledge of DirXML and the system being managed and is performed once during driver development. Developer level policy application may require detailed knowledge of DirXML, XSL transformations (XSLT), and the systems being managed by the driver.

In the present embodiments, these components (customer, consultant, developer) are divided into three role-based stages which can be jointly or separately performed on the computers 13, 14, and 15, respectively. The three stages correspond to roles requiring increasing skillsets to complete. The first stage is used to describe a policy in an abstract manner that makes sense to people updating policy data. The second stage is used to select which policy should be applied. This step may require a broader skill set because decisions must be made by examining data. The third stage is the back-end scripts needed to apply the policy. This stage may require detailed knowledge of the XML dataflow, XSLT and/or the needs and requirements of the systems where the policy is applied. For the sake of clarity, these three stages are performed by computers 13, 14, and 15.

Further, each policy stage can reference an XML schema, an XML Document Type Definition (DTD), or namespace to define the types of data that can be represented at each stage. These references provide context to an editing user, or an editing tool, to determine what kinds of content each stage should contain. For example, a DTD can describe a valid XML structure for an event and tell what sort of events can take place and what information can be in those events. For instance, an "add," a "modify," a "move," and a "delete" are possible events, but the DTD would tell that a "shuffle" is an illegal command. A visual tool could display the data in the stage using appropriate editing controls, as well as allow the insertion of additional elements or element sets.

For the sake of further example, the three stages will be discussed in greater detail below, in reverse order (stage 3, stage 2, and then stage 1).

Stage 3

The third stage uses the policy selection from stage 2 to select a policy from stage 1, and then implements that policy in a DirXML driver. An implementation may write one or more XSL named templates to apply policy. These templates are then called from other XSL templates that operate on DirXML events such as "add", "modify" or "delete".

In the present embodiment, stage 3 (computer 15) includes XSL scripting code 40 that may actually changes events, hooks events, binds them with a template, and affects potentially both the application (computer 12) and the data in the data store 30 that it needs to perform an action. In the present embodiment, stage 3 may require a very experienced directional programmer with the information to write this part of the transformation. In fact, the person who actually wrote the application driver may also be the person who wrote the pre-configured action part (XSL scripting code 40) of the system so that it could come delivered to the customer with all of stage 3 completed.

In some embodiments, stage 3 could be fairly generic and include many driver writers to put either the same or very similar style sheets into the system to handle this part of the transformation engine. Stage 3 may do things like recognize that an "add" event is happening and then decide, based on what it sees in other parts of the system, the actions to put people into groups, or to give them certain access rights, or whatever the policy happens to be. In the present embodiment, stage 3 job needs to know which policies apply to which users (stage 2) and it has to know about the data payload in the policy (stage 1).

Provided below is one example of source code that could be used to implement stage 3:

```
<xsl:template name="employeeStatusPolicyApply">
  <!-- get a policy name -->
  <xsl:variable name="policyName">
    <xsl:call-template name="employeeStatusPolicySelect"/>
  </xsl:variable>
  <!-- read in policy based on policy name -->
  <xsl:variable name="policy"
    select="document('')/xsl:transform/xsl:variable[@name='empStatusGroupPolicyRtf']
    /*[name( )=$policyName]/groups"/>
  <!-- make the changes -->
  <xsl:if test="$policy">
    <xsl:choose>
      <!-- if <add> -->
      <xsl:when test="name( )='add' and $policy/add">
        <add-attr attr-name="memberOf">
          <xsl:for-each select="$policy/add">
            <value>
              <xsl:value-of select="text( )"/>
            </value>
          </xsl:for-each>
        </add-attr>
      </xsl:when>
      <!-- if <modify> -->
      <xsl:when test="name( )='modify' and $policy/add|remove">
        <modify-attr attr-name="memberOf">
          <xsl:for-each select="$policy/remove">
            <remove-value>
              <value>
                <xsl:value-of select="text( )"/>
              </value>
            </remove-value>
          </xsl:for-each>
          <xsl:for-each select="$policy/add">
            <add-value>
              <value>
                <xsl:value-of select="text( )"/>
              </value>
            </add-value>
          </xsl:for-each>
        </modify-attr>
      </xsl:when>
    </xsl:choose>
  </xsl:if>
</xsl:template>
```

Stage 2

The second stage uses information in a DirXML data change event to select a Stage 1 policy. This stage may require knowledge of DirXML events and XSLT and is typically maintained by a trained consultant. The scope of knowledge needed to complete this task may be bounded by the ability to inspect DirXML objects and potentially issue DirXML queries.

In the present embodiment, stage 2 (computer 14) is used to make decisions about which objects should have which policy applied to them. Unlike stage 3 which is more generic, the actual choice of which policies apply to which users may be unique to a specific enterprise or operating environment. It is likely that the computer 14 is located at an end user location and, depending on the user's expertise, could be done by somebody who doesn't really know DirXML or XSLT or it can be somebody who knows XSLT and is just going to write these rules in a text editor.

The computer 14 of stage 2 includes a text tool 42 and a visual tool 44. The text tool 42 allows a user to simply edit XML. This works well if the user understands XSL. Alternatively or in addition, the visual tool 44 provides a graphical interface, such as a menu driven system, that allows the user to make choices about an employee or other entity that is associated with a specific policy. The visual tool 44 can call metadata within XSL that would give the visual tool hints about how it should display the choices to the user that has a particular policy choice. The visual tool 44 can then turn the user inputs into an XSL template, which can be a subroutine. The stage 3 implementer can then call this subroutine to make the choice and the subroutine just returns the answer.

Provided below is one example of source code that could be used to implement stage 2:

```
<xsl:template name="employeeStatusPolicySelect">
  <xsl:choose>
    <!-- replace with custom policy -->
    <xsl:when test="false( )"/>
    <!-- fallback policy -->
    <xsl:otherwise>
      <xsl:value-of select="string('default')"/>
    </xsl:otherwise>
  </xsl:choose>
</xsl:template>
```

It is also possible to write a visual tool to build certain types of policy selections using a dialog or wizard interface.

Stage 1

The first stage may require the fewest skillsets to update. In one embodiment, it is an XML fragment that describes the actions that need to be taken for any given policy in an abstract manner. The fragment may be embedded in an xsl:variable within the implementing transform or supplied as an external XML document.

In the present embodiment, stage 1 (computer 13) uses the power of XML to make the entire process as easy as possible. Stage 1 can be used to provide the actual data to be provided to the target applications 12 or from the target applications 12 back into the directory 30. For example, a new department can be added over an existing active directory by simply inserting XML into the transformation engine 34. Similar to the text tool 42 and the visual tool 44 of stage 2, stage 1 includes a text tool 46 and a visual tool 48. There are different ways for this to operate. One way is to have a separate document that holds a bubble policy and every time a transformation is performed, the transformation engine 34 provides the stage 1 information into a second document. A second way is to set up an XSL variable within the transformation that holds this information. Once the stage 1 data is set inside of a variable, the information inside the variable does not have to be XSL, it can just be pure XML and the user can operate on it from there. From then on, the user can use normal XML functions, such as building XML tags in a data centric from a data centric viewpoint. Also, a DTD function could be used to explain what the information inside of the XML block looks like. Alternatively or in addition, an XML schema or XML "X-Forms" could be used.

In typical usage, first level XML elements name a selectable policy. Second level elements name a policy type. Lower level elements define policy actions and follow the rules setup for their type. In the following example source code, the selectable policy 'activeManager" includes a 'groups' policy which defines group membership rules for active managers. This general structure can be updated with additional XML elements and attributes that describe how the policy is to be presented visually to the user.

Provided below is one example of source code that could be used to implement stage 1:

```
<xsl:variable name="employeeStatusPolicyRtf">
  <!-- active manager policy -->
  <activeManager>
    <groups>
<remove>CN=Employees,CN=Users,DC=td,DC=provo,DC=novell,DC=com</remove>
      <add>CN=Managers,CN=Users,DC=td,DC=provo,DC=novell,DC=com</add>
    </groups>
  </activeManager>
  <!-- active non-manager employee policy -->
  <activeEmployee>
    <groups>
<remove>CN=Managers,CN=Users,DC=td,DC=provo,DC=novell,DC=com</remove>
      <add>CN=Employees,CN=Users,DC=td,DC=provo,DC=novell,DC=com</add>
    </groups>
  </activeEmployee>
  <!-- all inactive employee policy -->
  <inactive>
    <groups>
<remove>CN=Managers,CN=Users,DC=td,DC=provo,DC=novell,DC=com</remove>
<remove>CN=Employees,CN=Users,DC=td,DC=provo,DC=novell,DC=com</remove>
    </groups>
  </inactive>
  <!-- config to use if you do not want group provisioning -->
  <none/>
</xsl:variable>
```

Although only a few exemplary embodiments of this invention have been described in detail above, those skilled in the art will readily appreciate that many modifications are possible in the exemplary embodiments without materially departing from the novel teachings and advantages of this invention. For example, a visual tool could be used to manage one or more of the different stages. Accordingly, all such modifications are intended to be included within the scope of this invention.

We claim:

1. A computer system comprising:
a processor;
a storage device electrically connected to the processor;
an operating environment;
an interface for receiving data objects including a data change event, the data objects corresponding to information pertaining to an enterprise policy and in a predetermined format;
a first application for enabling a user to define a plurality of policies in an abstract manner for an enterprise, the plurality of policies being built using a domain-specific language that is structured in terms of an effect the policy will have on a target system;
a second application for selecting one or more policies to be applied to the events, the selection of the policies being specific to the enterprise; and
a third application for transforming the data objects by applying the one or more selected policies to the event by using XSL scripting code,
the application of the policies performing one or more of changing the event, hooking the event, binding the event with a template, and informing the data store that an action needs to be performed.

2. The computer system of claim 1 wherein the predetermined format and the domain-specific language are defined on extensible markup language (XML).

3. The computer system of claim 1 wherein the data objects are XML documents and the transformation uses at least one of an extensible stylesheet language (XSL) variable and an XSL template to apply the selected policy to the data objects.

4. The transformation engine computer system of claim 1 wherein the first application includes a separate document for storing the transformed data objects.

5. The transformation engine computer system of claim 1 wherein the first application further enables for setting up an XSL variable within the transformation that stores the information for later use.

6. The computer system of claim 1 wherein the second application utilizes an XSLT style sheet.

7. A computing system for use in a computer network, the computing system comprising:
 a processor;
 a storage device connected to the processor;
 a main software application for providing bi-directional data sharing across directories, databases and applications on the computer network, the main software application working, at least in part, in response to XML events;
 a data store that can send one or more XML documents back and forth to a transformation engine, the XML documents including XML events;
 the transformation engine for taking the XML documents and applying the XML documents against an XSL style sheet or an XSL transformation to transform the XML events into a different type of event for a controlled application or service, the transformation engine comprising:
 a first task for defining a plurality of policies in an abstract manner for an enterprise, each of the plurality of policies being built as XML data that is structured in terms of an effect the policy will have on a target system;
 a second task for selecting one or more policies to be applied to the events, the selection of the policies being specific to the enterprise;
 a third task for to applying the one or more selected policies to the event by using XSL scripting code, the application of the policies performing one or more of changing the event, hooking the event, binding the event with a template, and informing the data store that an action needs to be performed.

8. Computer readable media accessible by at least one computing system, the computer readable media having stored thereon computer executable instructions, that, when executed:
 in a first process:
 create a data object in a predetermined format, wherein the data object is associated with a policy, wherein the predetermined format defines a policy template and a policy variable, and
 wherein the predetermined format is structured in terms of a final effect of the policy;
 in a second process:
 receive the data object;
 transform at least one policy template, policy variable or combination of policy templates and policy variables within the data object into a policy section in the data object; and
 modify the data object in conformance with the policy section.

9. The computer readable medium comprising computer executable instructions of claim 8 wherein one of the policy template and the policy variable comprises a portion written in a domain-specific language.

10. The computer readable medium comprising computer executable instructions of claim 8 wherein the policy section is scoped in complexity relative to at least one policy template, policy variable, or combination of policy templates and policy variables, and semantically identical to said policy template, policy variable, or combination of policy templates and policy variables.

11. The computer readable medium comprising computer executable instructions of claim 8 wherein the transforming one of a policy template, a policy variable, or a combination of policy templates and policy variables produces results with different scopes of complexity.

12. The computer readable medium comprising computer executable instructions of claim 8 wherein the transforming one of a policy template, a policy variable, or a combination of policy templates and policy variables is iterative.

13. The computer readable medium comprising computer executable instructions of claim 8 wherein the domain-specific language is defined on XML or formatted according to an XML-based specification.

14. The computer readable medium comprising computer executable instructions of claim 8 wherein the data object is formatted according to a first XML-based specification and at least one of the policy template or policy variable is formatted according to a second XML-based specification.

15. The computer readable medium comprising computer executable instructions of claim 8 wherein the transforming one of a policy template, a policy variable, or a combination of policy templates and policy variables is accomplished via an XSL processor.

16. The computer readable medium comprising computer executable instructions of claim 8 wherein the policy section is an XSL stylesheet.

17. The computer readable medium comprising computer executable instructions of claim 8 wherein at least one of the policy templates, policy variables, or combinations of policy templates and policy variables utilizes a second document.

18. The computer readable medium comprising computer executable instructions of claim 8 wherein at least one of transforming or modifying provides information to an outside receiver.

19. The computer readable medium comprising computer executable instructions of claim 8 wherein at least one of transforming or modifying reads or writes information in an outside data store.

* * * * *